INVENTOR
HARVEY F. MARANVILLE
BY
Evans & McCoy
ATTORNEYS

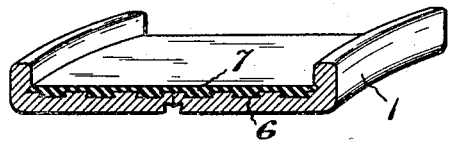
Fig. 1.
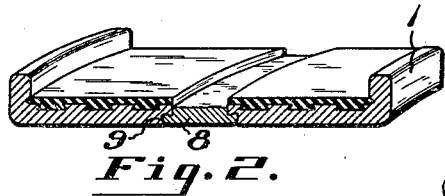
Fig. 2.
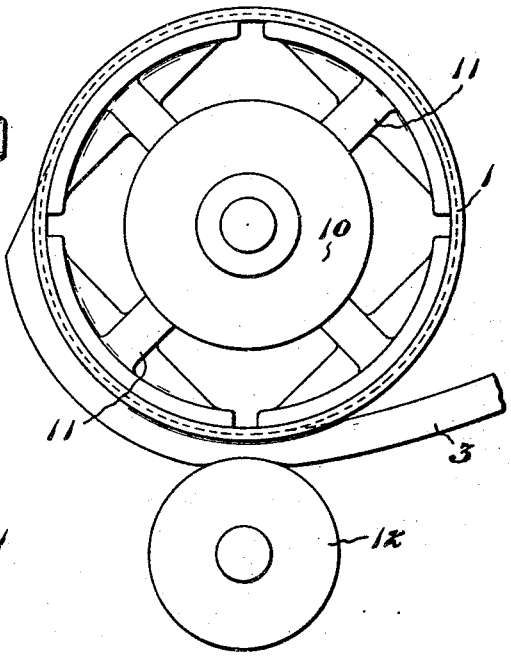
Fig. 7.
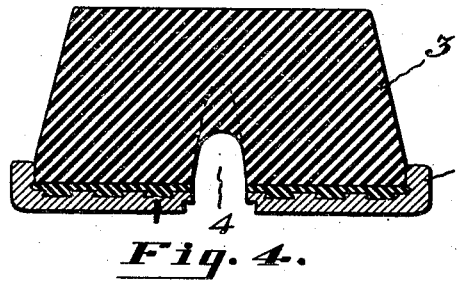
Fig. 3.
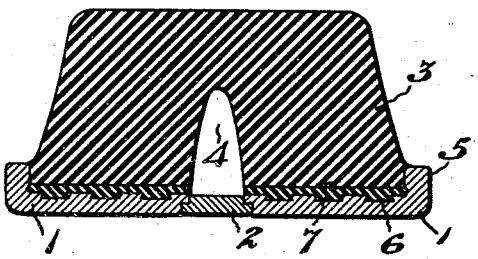
Fig. 6.
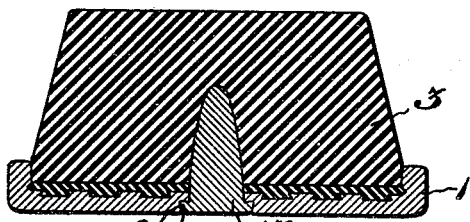
Fig. 4.
Fig. 5.
INVENTOR
HARVEY F. MARANVILLE
BY
Evans + McCoy
ATTORNEYS Sept. 15, 1931. H. F. MARANVILLE 1,823,566
METHOD OF FORMING TIRES
Filed April 19, 1929 3 Sheets-Sheet 2

Sept. 15, 1931.   H. F. MARANVILLE   1,823,566
METHOD OF FORMING TIRES
Filed April 19, 1929    3 Sheets-Sheet 3

INVENTOR
HARVEY F. MARANVILLE
BY
Evans & McCoy
ATTORNEYS

Patented Sept. 15, 1931

1,823,566

UNITED STATES PATENT OFFICE

HARVEY F. MARANVILLE, OF AKRON, OHIO, ASSIGNOR TO THE GENERAL TIRE & RUBBER COMPANY, OF AKRON, OHIO, A CORPORATION OF OHIO

METHOD OF FORMING TIRES

Application filed April 19, 1929. Serial No. 356,452.

This invention relates to a method of forming tires and particularly to a method of forming tires of the resilient cushion type adapted for use on trucks and other heavy commercial vehicles.

One of the objects of the present invention is to provide a new and novel method of forming resilient cushion tires.

Another object is to provide a method of forming cushion tires whereby the resilient element will have a more perfect and secure union with the base band when the tire is completed and will be less liable to work loose from the base band when the tire is subjected to severe use.

A further object is to provide a method of forming cushion tires having an internal circumferential recess between the side walls thereof. whereby the recess can be formed after the tire body has been securely stitched to the base band, with the result that the tire body will have a more perfect union with the base band when the tire is completely built.

A still further object is to provide an improved method of forming a recessed cushion tire.

With the foregoing and other objects in view which will be apparent from the detailed description to follow, this invention consists in certain novel forming methods which will be readily understood by those skilled in the art.

Referring to the accompanying drawings, Figure 1 is a fragmentary perspective view showing the cross-sectional shape of the base bands and showing the base bands connected together by a rubber composition material used to insure proper union between the tire body and the base bands.

Fig. 2 is a view similar to Fig. 1 showing the base bands in spaced relationship and held together by a spacer locking ring.

Fig. 3 is a transverse section showing the tire body stitched to the base bands in the process of manufacture.

Fig. 4 is a section similar to Fig. 3 showing a portion of the central recess formed in the tire body, the complete recess being shown in broken outline.

Fig. 5 is a transverse section of the tire body and base bands showing the vulcanizing core inserted in the cushioning recess.

Fig. 6 is a transverse section of a completed cushion tire showing the locking element for the base bands in position.

Fig. 7 is a diagrammatic side elevation showing the tire body being rolled or stitched to the base bands.

Figure 8:
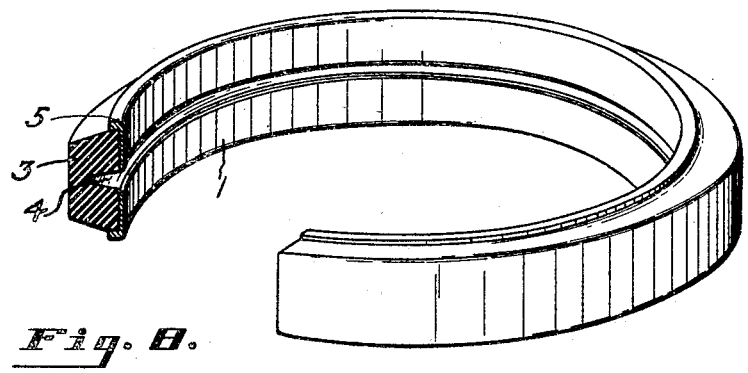
Fig. 8 is a perspective view of a cushion tire, a portion of the same being broken away and the locking ring being removed to show the cushioning recess therein.

As shown in Fig. 6, the cushion tire to which the present invention appertains, is of the type embodying a tire body vulcanized to a metallic base, and having a continuous and unbroken tread connecting the side walls or leg portions of the tire, a cushioning recess being formed between the side walls. This cushioning recess in tires heretofore manufactured was formed in the tire body during the extruding operation of forming the tire body, or the tire body was built up on the base with the forming core for the recess carried by the base. The tire body was then stitched to the base band by rolling the same under pressure, and then vulcanized. It has been found that tires manufactured in this manner would sometimes separate from the base band when subjected to hard usage. It has developed that this separation generally resulted from weak or poor union between the tire body and base band. Sufficient pressure could not be exerted on the tire body during the stitching operation to effect a secure union between the tire body and base band. The rolling or stitching operation would also tend to distort the tire body because of the recess and the forming core therein and would not firmly engage the base band. The tire body would also tend to rupture adjacent the recess during the rolling operation.

The present invention proposes an improved method of forming cushion tires of the type described which insures a more perfect union or bond between the tire body and base bands which materially lessens the possibility of separation of the tire body from the base band when the tire is subjected to severe usage.

Referring to the accompanying drawings in which like numerals refer to like parts throughout the several views, the completed tire, as shown in section in Fig. 6, comprises a pair of base bands 1 locked together with a suitable locking ring 2 to which a tire body 3 of suitable rubber material is vulcanized, the tire body being provided with a cushioning recess 4 disposed intermediate its side portions. Each base band 1 is preferably provided with a side flange 5 and is formed with a number of circumferential dove-tailed recesses 6 in the outer face of the horizontal portion thereof for receiving a suitable vulcanizable hard rubber composition 7.

The base bands 1 are first sanded or otherwise cleaned in any suitable manner. The bands 1 are held in abutting relationship so that the vulcanizable hard rubber composition 7 can be applied thereto under great pressure to cover the outer faces of the horizontal portions that receive the cushion body and fill in the dove-tailed grooves 6 substantially as shown in Fig. 1.

The base bands 1 are then separated by circumferentially severing the hard rubber composition 7 adjacent the abutting edges and a locking ring 8 is inserted in locking ring grooves 9 formed in the inner side faces of the base bands 1 to securely hold the base bands in spaced relationship. This condition and spaced position of the bands 1 is shown in Fig. 2.

The base bands 1 securely held together in spaced relationship in the manner just described, are than supported on a freely rotatable fixture 10 having a number of clamping arms 11 which are moved outwardly to securely clamp the bands in a position concentric with the rotatable fixture 10, as shown in Fig. 7. The tire body 3 which is previously cut to the proper length is then stitched to the bands 1 by a rolling operation. A driven roller 12 is positioned directly below the fixture 10 in spaced relationship to the base bands 1 and the stock 3 is fed between the bands 1 and roller 12. The roller 12 forces the tire body stock 3 toward the base bands 1 under great pressure and compresses the same between the side flanges 5 of the base bands so that the stock 3 is forced into very intimate engagement with the side flanges 5 and the hard rubber composition 7. When the pressure is removed after the rolling operation, the tire body is securely stitched to the base bands 1. The recess 4 has not as yet been formed in the tire body 3, and it is evident that, because of this, the solid uniform body of stock will not distort during the rolling operation nor draw away from the base bands at any point when permitted to assume its normal position.

Figure 9:
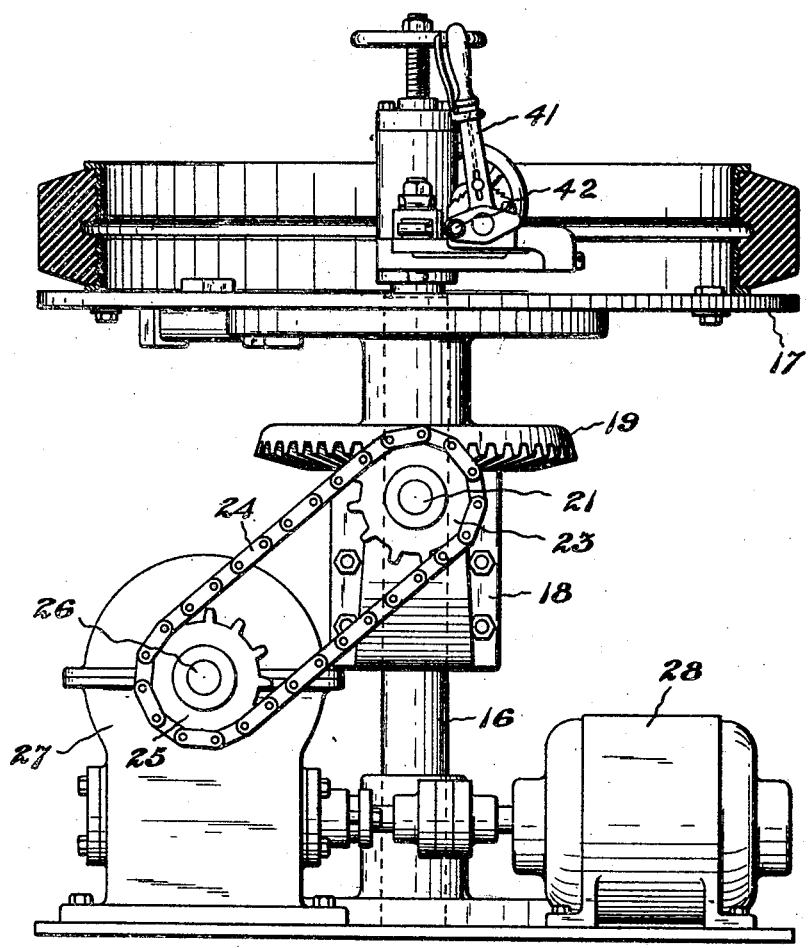
Fig. 9 is an elevational view of the apparatus for forming the cushioning recess in the tire body, showing the tire body and base bands in position thereon, the tire being shown in section to illustrate the partially formed recess therein.
Figure 10:
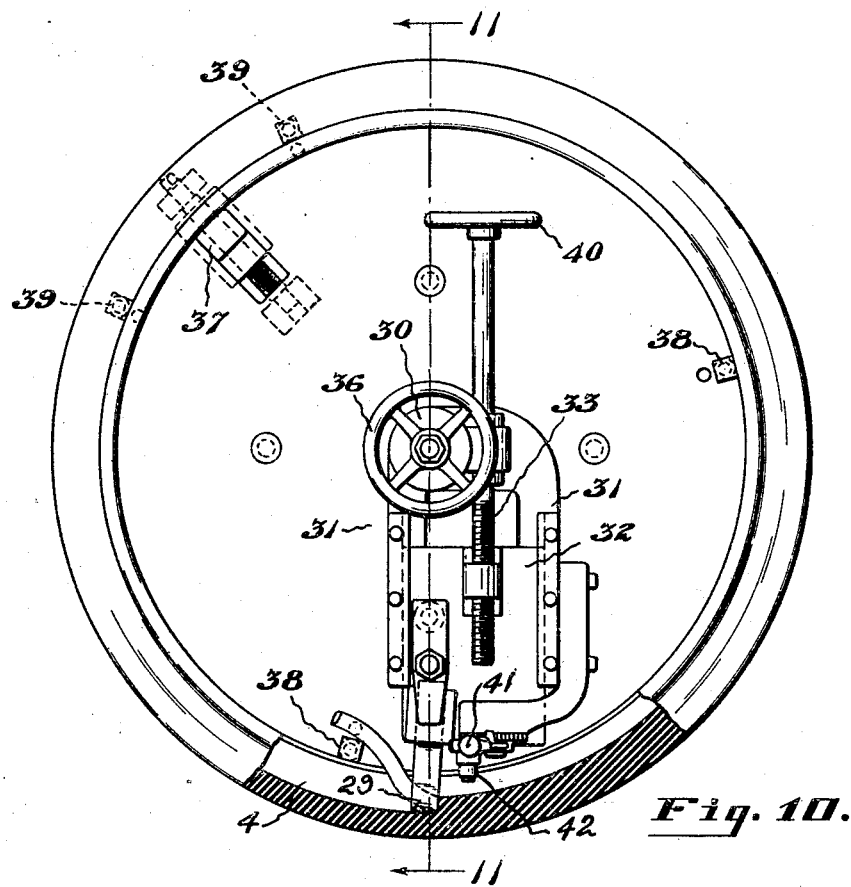
Fig. 10 is a top plan view of the apparatus shown in Fig. 9, a portion of the tire being broken away to show the recess being formed in the tire body.
Figure 11:
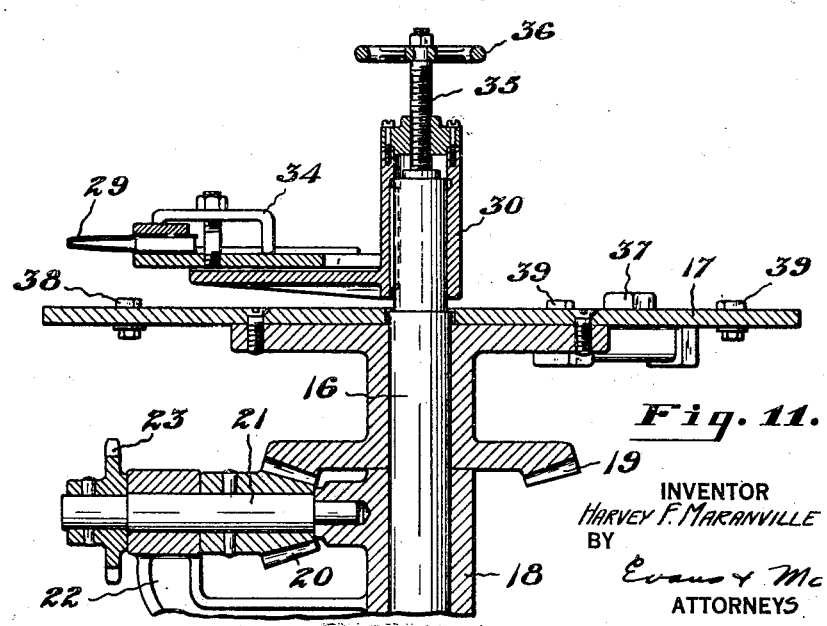
Fig. 11 is a partial section of the apparatus shown in Fig. 9 taken substantially on the line 11—11 of Fig. 10.

After the tire body 3 is securely stitched to the base bands 1, the locking ring 8 is removed, and the recess 4 is then formed in the tire body 3 by the apparatus shown in Figs. 9, 10 and 11. The recess 4 is preferably formed in two operations, the first being to form the recess to a depth corresponding to that shown by the solid outline in Fig. 4, and the second being to form the recess to finished shape as shown in broken outline in Fig. 4 and in solid outline in Fig. 6. In forming the recess 4, the tire body 3 and base bands 1 are preferably held in a horizontal plane and rotated. A tool having the correct contour is inserted between the base bands 1 and the rubber stock is gouged out as the tire is rotated to partially form the recess. The tool is then removed and a second tool used to completely form the recess to the desired shape.

A suitable segmental core 13 is then inserted in the completely formed recess 4, and is locked therein by the engagement of the beads 14 with the lock ring grooves 9. This core is preferably slightly larger in section than the recess. The tire is next positioned in a suitable vulcanizing mold, and the tire body 3 is securely vulcanized to the base bands 1. It is apparent that by reason of the fact that all points of the tire body 3 are in intimate contact with the base bands, the tire body will be securely vulcanized to the base bands at all points.

When the vulcanizing operation is completed, the tire is removed from the vulcanizing mold and the cores 13 are removed from the cushioning recess 4. The permanent locking ring 2 is then inserted between the base bands 1 to securely hold the base bands 1 in spaced relationship in order to obtain the full advantage of the cushioning recess 4.

It is plainly evident to those skilled in the art that the method of forming cushion tires proposed by the present invention presents many advantages which cannot be obtained by any of the methods used heretofore.

In Figs. 9, 10 and 11, the preferred apparatus for forming the cushioning recess 4 in the tire body 3 after the body has been secured to the base bands 1, is illustrated. This machine as illustrated comprises a stationary vertical post 16 having a rotatable horizontal tire receiving table 17 mounted thereon and supported by bracket members 18 securely clamped to the post 16. As shown in Figs. 9 and 11, the table 17 is rotated by means of a bevel gear 19 mounted thereon which meshes with a bevel pinion 20 secured to a horizontal shaft 21 that is journaled in an arm 22 which forms a part of the supporting bracket 18. A chain sprocket 23 is secured to the outer end of the shaft 21 and is driven through the medium of a chain 24 and a sprocket 25 that is mounted on a shaft 26 of a suitable speed reducing mechanism 27, the speed reducing mechanism being driven by an electric motor 28.

The tool or gouge 29 for forming the recess 4 in the tire body 3 is mounted in a support positioned above the rotatable table 17. This support comprises a cylindrical member 30 keyed to the upper end of the vertical shaft 16, and provided with a pair of horizontal parallel arms 31 which serve as guideways for the tool rest 32 which is horizontally movable. A screw 33 rotatably mounted on the member 30 and threaded into the tool rest 32 is provided to move the tool rest 32 so that the tool 29 which is secured thereto by a screw clamp 34 can be moved into and out of the recess being formed in the tire body 3. The tool rest and support are provided with vertical adjusting means to permit recesses to be formed in cushion tires of different widths. This means comprises a screw 35 threaded into the end of the member 30 and engaging the end of the post 16. By rotating a hand wheel 36 secured to the end of the screw 35, the tool support 30 and consequently the tool 29 can be adjusted vertically to accommodate tires of different widths.

As shown in Figs. 8 and 9, a ratchet lever 41 having a roller 42 thereon is pivoted to the tool support 32, the roller 42 being adapted to be positioned between the base bands 1 when the apparatus is in operation. By actuating the ratchet lever 41, the roller 42 can be forced against the upper base band 1 to positively space the same from the lower band when the recess is being formed to prevent the base bands from seizing the cutting tool 29.

The tire body 3 stitched to the base bands 1 is positioned horizontally on the table 17 and is clamped thereon concentric with the post 16 by means of a screw block 37 which securely clamps the lowermost base band against inner and outer stop members 38 and 39 secured to the table 17.

The apparatus is set in motion and the hand wheel 40 on the shaft 33 is rotated to move the tool 29 between the base bands 1 to engage the tire body 3 so that the preliminary recess can be formed. The tool 29 gouges out the rubber stock in forming the preliminary recess and is gradually moved inwardly in the tire body until the preliminary recess is completely formed. This tool is then removed from the tool rest 32 and replaced by another tool having the exact contour of the finished recess 4. This tool is, like the tool 29, moved into the tire body by rotating the hand wheel 40 until the recess 4 is completely formed to the finished shape shown in Figs. 6 and 8.

It is plainly evident that the apparatus just described provides a very satisfactory means for forming the recess 4 in the tire body 3, but it is to be understood, however, that the present invention is not limited to the use of this particular apparatus, as other recess forming mechanisms may be used to advantage.

It is apparent to those skilled in the art that by using the method of the present invention for forming cushion tires such as those used in commercial vehicles, complete engagement of the tire body with the base bands is insured and, by forming the cushioning recess after the stitching operation, considerably greater rolling pressure can be exerted against the tire body during the stitching operation.

In the claims which follow, the term "cushion" is intended to include solid tires having an internal cavity therein which is either continuous or segmental, regardless of whether or not the tire is externally grooved or otherwise shaped for traction or additional cushioning purposes.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. The method of forming cushion tires which consists in stitching a tire body of solid stock to a pair of base bands held in spaced relation to each other, forming a cushioning recess in said body after the stitching operation, and vulcanizing said tire body to said base bands.

2. The method of forming cushion tires which consists in holding a pair of base bands in spaced relationship, stitching a tire body of solid stock to said base bands, removing stock from an internal portion of said tire body to form a cushioning recess in said tire body, and vulcanizing said body to said base bands.

3. The method of forming cushion tires which consists in rolling a tire body of solid stock into a pair of spaced base bands with unusually great pressure, rotating said tire body and base bands, removing stock from an internal portion of said tire body to form an internal recess in said tire body, vulcanizing said body to said base bands after said recess has been formed, and permanently locking said bands in spaced relationship.

4. The method of forming cushion tires which consists in holding a pair of base bands in spaced relationship, rolling a tire body of solid stock onto said bands with unusually great pressure, forming a cushioning recess in said tire body, temporarily filling in said recess, vulcanizing said body to said base bands, opening up said recess after vulcanization, and then securely interconnecting said bands in spaced relationship.

5. The method of forming cushion tires which consists in holding a pair of base bands in spaced relationship, rolling a tire body of solid stock onto said base bands with unusually great pressure, rotating said base bands, removing material from said tire body adjacent the space between said base bands to form a recess in said body, temporarily filling in said recess, vulcanizing said tire body to said base bands, opening up said recess after vulcanization, and securely interconnecting said base bands in spaced relationship.

6. The method of forming cushion tires which consists in holding a pair of base bands in spaced relationship, rolling a tire body of solid stock onto said base bands with unusually great pressure, partially forming a recess in said tire body between said base bands, completely forming said recess to finished shape, temporarily filling in said recess, vulcanizing said tire body to said base bands, opening up said recess after vulcanization, and securely locking said base bands together in spaced relationship.

7. The method of forming cushion tires which consists in holding a pair of base bands in abutting relationship, applying a composition rubber coating to said bands, severing the coating to separate said bands, holding said bands in spaced relationship, rolling a tire body of solid stock onto said bands with great pressure, forming a cushioning recess in said tire body adjacent the space between said base bands, and vulcanizing said tire body to said base bands.

8. The method of forming cushion tires which consists in holding a pair of base bands in abutting relationship, applying a composition rubber coating thereto, severing said coating to separate said bands, holding said bands in spaced relationship, stitching a tire body of solid stock to said bands, rotating said bands and tire body, forming an internal cushioning recess in said body adjacent the space between said base bands during the rotation of said body, temporarily filling in said recess, vulcanizing said tire body to said base bands, opening up said recess after the vulcanizing operation, and locking said base bands together in spaced relationship.

9. The method of forming cushion tires which consists in forcibly compressing a continuous layer of hard rubber composition upon the outer roughened and recessed face portions of a pair of base bands secured in lateral abutment, separating the layer of hard rubber along the line of abutment of the base bands, stitching a tire body of solid stock to the aforementioned pair of base bands by pressure applied uniformly thereto in a radial direction while the base bands are held in predetermined spaced relation, machining an annular recess interiorly of the tire body, temporarily inserting therein an annular core of slightly greater cross sectional dimension for the portion received within the tire than the cross sectional dimension of said annular recess, and of vulcanizing said tire.

10. The process of constructing a cushion tire that comprises covering the peripheral faces of a pair of base bands with cementing material, mounting said base bands in spaced relationship, stitching a tire body of solid stock to the base bands by a pressure rolling operation, forming an internal annular groove in the tire body, and vulcanizing the tire.

In testimony whereof I affix my signature.

HARVEY F. MARANVILLE.